Figures 1, 2:
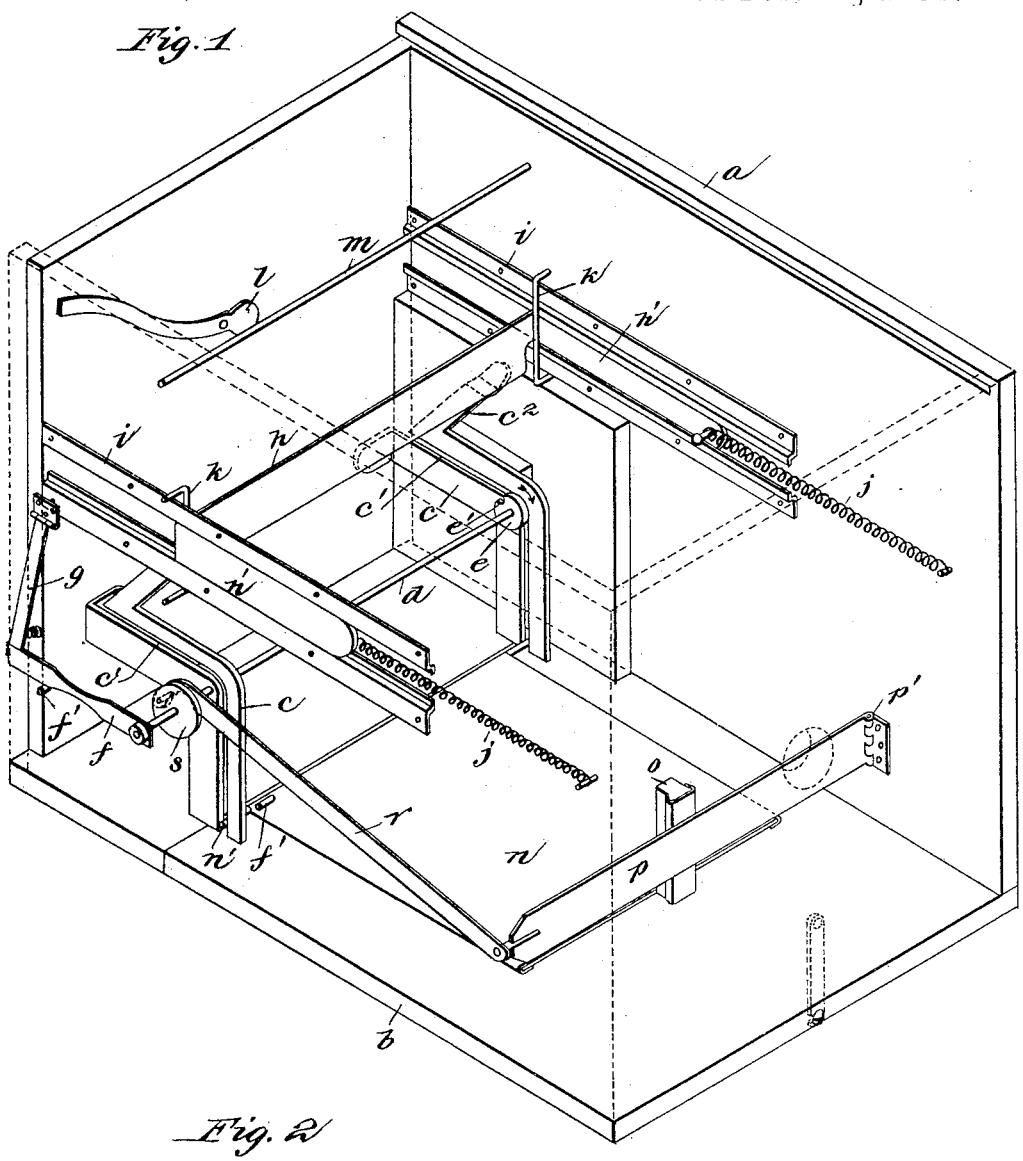

(No Model.)  2 Sheets—Sheet 1.

K. E. & F. V. CONLEY.
MAGAZINE CAMERA.

No. 599,314. Patented Feb. 22, 1898.

Witnesses.  Inventors
J. F. Coleman  Kerry Ellsworth Conley.
Nellie Callahan  Frederick Victor Conley.
by Wm. H. Finckel
Attorney.

(No Model.) 2 Sheets—Sheet 2.
K. E. & F. V. CONLEY
MAGAZINE CAMERA.
No. 599,314. Patented Feb. 22, 1898.
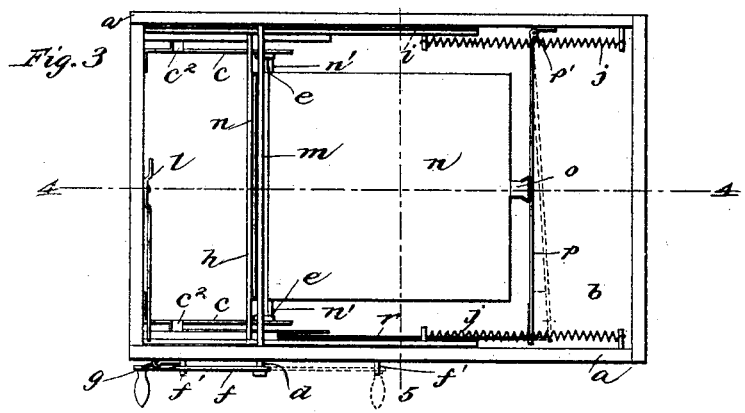
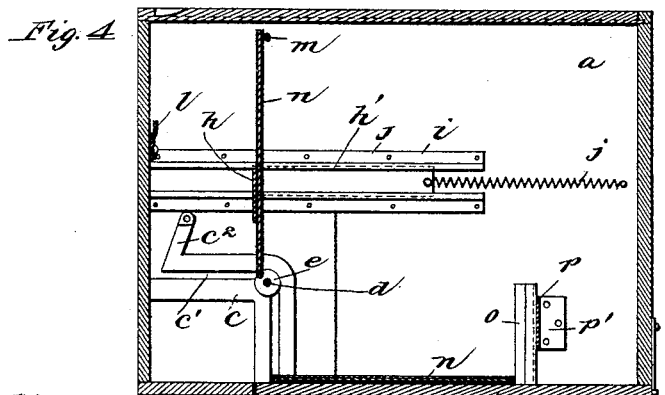
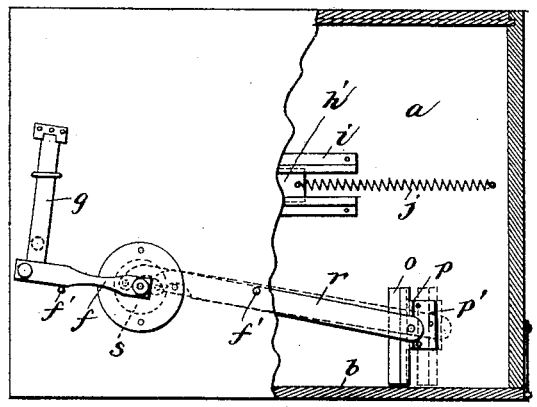
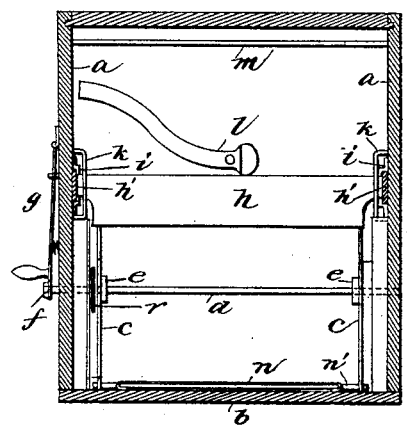
Witnesses.
J. P. Coleman
Nellie Callahan
Inventors
Kerry Ellsworth Conley.
Frederick Victor Conley.
by Wm. N. Finchel
Attorney.

UNITED STATES PATENT OFFICE.

KERRY ELLSWORTH CONLEY AND FREDERICK VICTOR CONLEY, OF SPRING VALLEY, MINNESOTA.

MAGAZINE-CAMERA.

SPECIFICATION forming part of Letters Patent No. 599,314, dated February 22, 1898.

Application filed August 14, 1897. Serial No. 648,192. (No model.)

*To all whom it may concern:*

Be it known that we, KERRY ELLSWORTH CONLEY and FREDERICK VICTOR CONLEY, citizens of the United States, residing at Spring Valley, in the county of Fillmore and State of Minnesota, have invented certain new and useful Improvements in Photographic Cameras, of which the following is a full, clear, and exact description.

This invention relates to that class of photographic cameras known as "magazine-cameras."

The objects of the invention are to provide means for holding the plates in position, for discharging them after exposure, and for removing them for development.

The invention comprises a plate-holder having a transverse guide at its lower end only, guideways in which the plate-holders are sustained by their guides and in which they are caused to travel, a spring-follower for feeding forward the plate-holders, a rotary shaft for discharging the plate-holders containing the exposed plates, and a reciprocating fender for receiving the discharged plate-holders.

The invention also comprises a drop-bottom for the camera.

Having thus stated the features constituting the principle of our invention, we will proceed now to describe the best mode in which we have contemplated applying that principle, and then will particularly point out and distinctly claim the part, improvement, or combination which we claim as our invention.

In the accompanying drawings, illustrating our invention, in the several figures of which like parts are similarly designated, Figure 1 is a perspective view showing the interior of our camera with the near side and end and top removed. Fig. 2 is an elevation of the plate-holder. Fig. 3 is a top plan view of the interior of the camera. Fig. 4 is a vertical section taken in the plane of line 4 4, Fig. 3. Fig. 5 is a transverse section taken in the plane of line 5 5, Fig. 3; and Fig. 6 is a side elevation with the right-hand portion broken away to show the interior of the camera in elevation.

The camera-box $a$ may be of suitable construction, with a light-tight cover and a hinged bottom $b$. Within the camera and on opposite sides are erected the guideways $c$, each having the guide-path $c'$, portions of such guideways being horizontal in order to receive and sustain the plate-holders for purposes of exposure, and other portions being vertical to provide for the discharge of the plate-holders after exposure of the plates therein. The guideways are made with the inclined members $c^2$ to aid in inserting the plate-holders in the guide-paths.

At the angle between the horizontal and vertical portions of the guideways is mounted a shaft $d$, which is provided with the disks $e$, each of which is constructed with a notch $e'$ to receive the guides of the plate-holders, and this shaft $d$ is provided on the outside of the camera with a crank-handle $f$, whose movement is limited by the stop-pins $f'$ $f'$, and said crank-handle is held in inoperative position by means of a spring-latch $g$ of any suitable construction.

$h$ is a follower erected above the guideways transversely of the camera, having arms $h'$, which slide in guideways $i$, and this follower is normally pulled forward by means of springs $j$, which are connected by one of their ends to the sides of the camera and at their other ends to the arms $h'$. The forward movement of the follower is arrested by means of stops $k$. When it is desired to load the camera with plates, the follower is manually drawn to the rear of the camera and held by a latch $l$, which is pivoted to the back plate of the camera.

Above the follower and in the same vertical plane as the shaft $d$ is erected a stop or rest $m$, against which the upper ends of the plate-holders are arrested and from which the said plate-holders are released when the shaft $d$ is rotated in the direction of the arrow, Fig. 1.

The plate-holders $n$ may be of any ordinary construction adapted to receive sensitized plates or other sensitive mediums, and the lower ends of these plate-holders are provided with the laterally-projecting guides $n'$, which travel in the guide-paths and are engaged by the notches $e'$ of the disks $e$ in such manner that when the shaft $d$ is rotated in the direction of the arrow, Fig. 1, the plate-holder, whose guides are then in engagement with the said notched disks, will be drawn away from the rest $m$ and be discharged into the bottom of the camera.

$o$ is a buffer or cushion, of rubber or other substance, mounted upon a bar $p$, which latter is hinged at one end, as at $p'$, to one side of the camera, and its other end is connected by a rod $r$ with a disk, eccentric, or crank $s$ on the shaft $d$. As the shaft $d$ is rotated to discharge an exposed plate and its plate-holder into the bottom of the camera, the bar $p$ is also vibrated upon its pivot, so as to move away from the descending plate, and thereafter as the shaft $d$ is reversely rotated the said bar is brought back into its first position, so as to cause its buffer to bind the plate-holder between itself and the vertical portions of the guideways, and hence when it is desired to remove the plates for development the camera may be turned upside down and the bottom $b$ opened and the plate-holders will be found to be held between the said buffer and the vertical portions of the guideways against accidental displacement and in position for the operator to remove them from the camera.

The parts $o$ and $p$ and their connection with the shaft $d$ constitute what is herein referred to as the "fender."

Fig. 3 shows one of the plates in the upright position for exposure and the other plates in the bottom of the camera, and Fig. 4 shows one plate in position for exposure and another plate in the bottom of the camera.

We do not wish to be understood as limiting our invention to the exact details of construction and arrangement of parts, saving only as these features form elements of the claims hereinafter made.

What we claim is—

1. In a camera, guideways for receiving plate-holders having laterally-projecting guides, a spring-follower and a rest for holding the plates in position of exposure, a rotary shaft for discharging the plates, a buffer in the bottom of the camera, a pivoted bar to which such buffer is fixed, a disk on said shaft, and a rod connecting the free end of the said bar with said disk, substantially as described.

2. In a camera, guideways for receiving plate-holders having laterally-projecting guides, a spring-follower and a rest for holding the plates in position of exposure, a rotary shaft and notched disks thereon for discharging the plates, a fender, and a connection extending from said fender to the rotary shaft, and a spring-latch for holding the shaft and its connections in position, substantially as described.

3. A magazine-camera, having guideways adapted to receive plate-holders having laterally-projecting guides, a follower, a latch to hold the follower in position to facilitate the loading of the camera with plates in plate-holders, springs to draw the follower up against the stack of plate-holders when it is released from its latch, and a rest-bar for holding the plate-holders in position for exposure, means to discharge the plates and plate-holders, one at a time, from such position, and means to hold the discharged plate or plates and their holders against accidental displacement, substantially as described.

In testimony whereof we have hereunto set our hands this 21st day of June, A. D. 1897.

KERRY ELLSWORTH CONLEY.
FREDERICK VICTOR CONLEY.

Witnesses:
LILLIAN M. KNOLL,
J. D. UTLEY.